J. F. WELCH.
VEHICLE SPRING.
APPLICATION FILED MAR. 27, 1916.

1,214,246.

Patented Jan. 30, 1917.

WITNESSES:
L. J. Forde.
B. M. Doolin

INVENTOR
James F Welch
BY Strong & Townsend
ATTORNEYS

UNITED STATES PATENT OFFICE.

JAMES F. WELCH, OF COTATI, CALIFORNIA.

VEHICLE-SPRING.

1,214,246.　　　　　Specification of Letters Patent.　　Patented Jan. 30, 1917.

Application filed March 27, 1916. Serial No. 86,916.

*To all whom it may concern:*

Be it known that I, JAMES F. WELCH, a citizen of the United States, residing at Cotati, in the county of Sonoma and State of California, have invented new and useful Improvements in Vehicle-Springs, of which the following is a specification.

This invention relates to vehicle springs and their connection with the running gear.

One of the objects of the present invention is to provide a simple, substantial form of vehicle spring which is cheap to manufacture and easily applied, and so arranged as to take up and distribute the shocks incident to travel, in such a manner and to such an extent that the body of the vehicle will remain level and otherwise practically undisturbed by shocks.

Another object of the invention is to provide a spring mounting which is so arranged that cushioning effect is obtained on the upward as well as the downward movement of the vehicle body, thereby entirely preventing the catapulting effect to which most spring mountings are subjected.

Further objects will hereinafter appear.

The invention consists of the parts and the construction and combination of parts, as hereinafter more fully described and claimed, having reference to the accompanying drawings, in which—

Figure 1:
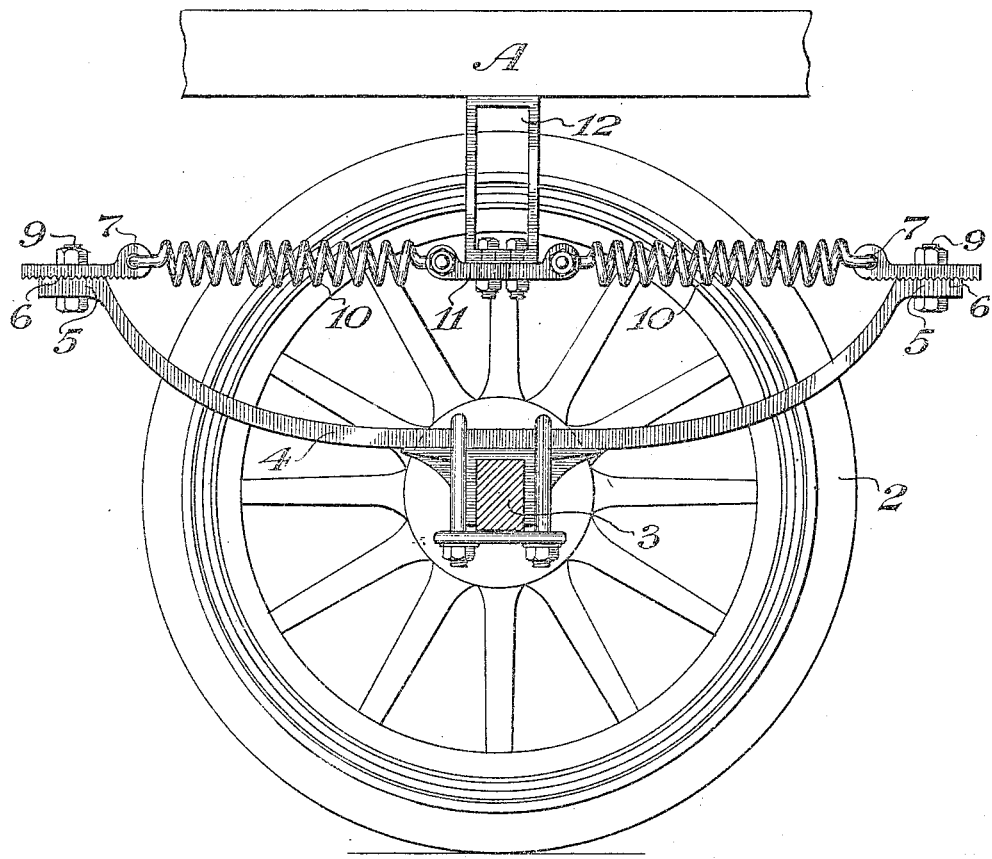
Figure 2:
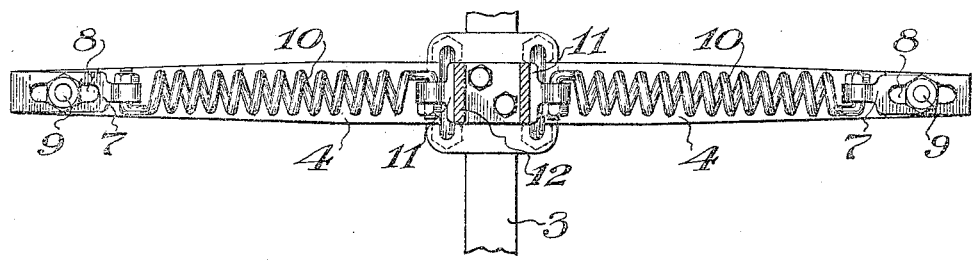

Figure 1 is a side elevation of the spring mounting, showing its application to a vehicle. Fig. 2 is a plan view of the spring.

Referring to the drawings in detail, A indicates a portion of a vehicle body; 2 a wheel and 3 the axle. Suitably secured to the axle as by bolts is a bow-shaped rigid bracket member 4, the outer ends of which are slightly extended as at 5 and provided with a serrated surface 6. The bracket 4 is centrally positioned to produce an even spacing between the outer ends and the center of the axle 3. Mounted on each extension 5 of the bracket is an eye-plate 7, the lower surface of which is serrated to register with the serrations 6 previously described. Each eye-plate is slotted as at 8 to permit a clamping bolt 9 to pass therethrough, it thus becomes possible to move the eye-plate in or out to rigidly secure same when adjusted, thus providing a means whereby the tension of the coil-spring indicated at 10 may be adjusted. The present structure shows the provision of two coil-springs, the outer ends of the springs are suitably secured to the eye-plates and the inner ends are similarly secured to a plate 11 to which is bolted a bracket 12 to form a rigid connection with the vehicle frame A. The eye bores in said plates extend horizontally and form bearings and pivot connections for the horizontal ends of the springs so that when the springs are extended or compressed under the influence of the up and down movement of the body A, the ends of the springs oscillate in said eye-bores. Nuts screw on to the extremities of the spring ends against the eyes of the eye-plates and hold the ends of the springs in the eye-bearings. The weight of the vehicle body will in this manner be exerted equally between the springs 10, in this manner permitting a cushioning effect not possible to secure by the usual spring mountings now employed. The cushioning effect is not only more yieldable and capable of absorbing shocks produced by unevenness in the road bed, but is equally operable to resist movement of the vehicle body either in an upward or downward direction. Any shock absorber can thus be eliminated and a catapulting tendency is reduced to a minimum.

A spring mounting constructed as here shown has been found to be so flexible and sensitive to shock that an ordinary steel tire wheel may be employed, when desired without producing any noticeable effect as far as easy riding of the vehicle body is concerned.

The device as a whole is so constructed that it may be applied to any standard type of vehicle whether auto or otherwise without making any radical changes in their construction and also without additional cost. The materials and finish of the several parts of the device may otherwise be such as the judgment and experience of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In a vehicle spring, a rigid bracket member adapted to be centrally secured to the vehicle axle, a pair of coil-springs having their outer ends secured to the bracket ends, a centrally disposed plate connecting the inner ends of the springs, and means for securing the vehicle body to said plate.

2. In a vehicle spring, a bow-shaped rigid bracket member adapted to be centrally secured to the vehicle axle, an adjustable eye-plate secured one on each bracket end, a pair of coil-springs having their outer ends secured one to each eye-plate, a centrally disposed plate connecting the inner ends of the springs, and means for securing the vehicle body to said plate.

3. In a vehicle spring, a bracket member adapted to be centrally secured to the vehicle axle, an extension on each end of the bracket having a serrated surface, a slotted-eye-plate on each bracket end extension having a serrated surface adapted to interlock with serrated bracket end extensions, means for securing the serrated members against lateral and endwise movement, a pair of coil-springs having their outer ends secured one to each eye-plate, a centrally disposed plate connecting the inner ends of the springs, and means for securing the vehicle body to said plate.

4. In a vehicle spring, a bow-shaped rigid bracket, means for securing said bracket to the vehicle axle in an upwardly bowed position, a pair of coiled springs having their outer ends secured to the bracket ends, and means for securing the inner ends of said springs to the vehicle body.

5. In a vehicle spring, a bow-shaped rigid bracket, means for securing said bracket to the vehicle axle in an upwardly bowed position, a pair of coiled springs having their outer ends secured to the bracket ends, a plate connecting the inner ends of said springs, a bracket depending from the vehicle frame, and means for securing said depending bracket to said plate.

6. In a vehicle spring, a rigid bracket adapted to be secured to the vehicle axle, a bracket secured to the vehicle body, and a pair of coil springs connected at their respective ends to said respective brackets and adapted normally to rest in a substantially horizontal position while sustaining the load of the vehicle.

7. In a vehicle spring, a rigid bracket secured to the vehicle axle, a pair of coil springs secured at their outer ends to the ends of said bracket, and means for securing the inner ends of said springs to the vehicle body in such position that said springs will normally rest in a substantially horizontal position while sustaining the load of the vehicle.

8. In a vehicle spring, a rigid bracket adapted to be secured to the vehicle axle, a bracket secured to the vehicle body, and a pair of coil springs connected at their respective ends to said respective brackets and adapted normally to rest in a substantially horizontal position while sustaining the load of the vehicle, and means for adjusting the tension of said springs.

9. In a vehicle spring, a rigid bracket adapted to be secured to the vehicle axle, a bracket secured to the vehicle body, and a pair of coil springs connected at their respective ends to said respective brackets and adapted normally to rest in a substantially horizontal position while sustaining the load of the vehicle, said vehicle body being sustained and controlled exclusively by said coiled springs.

10. In a device of the character as disclosed, a rigid bracket member detachably secured in position on the vehicle axle, a pair of coil springs having their outer ends secured to the bracket ends, a centrally disposed plate connecting the inner ends of the springs, and means for detachably securing the vehicle body to said plate.

11. In a device of the character as disclosed, a bracket member mounted on the vehicle axle, eye-bearings on said brackets, an eye bearing to which the body of the vehicle is secured, the bores of said eye-bearings extending horizontally, springs, the ends of which extend horizontally through said bearings.

12. In a device of the character as disclosed, a bracket member mounted on the vehicle axle, eye-bearings on said brackets, an eye bearing to which the body of the vehicle is secured, the bores of said eye-bearings extending horizontally, springs, the ends of which extend horizontally through said bearings, and nuts on said ends of said springs engaging the eye-bearings.

In testimony whereof I have hereunto set my hand in the presence of two subscribing witnesses.

JAMES F. WELCH.

Witnesses:
  F. C. THOMPSON,
  R. M. BARRET.